United States Patent [19]

Brevick

[11] 4,387,279
[45] Jun. 7, 1983

[54] COLUMN MOUNTED SWITCH FOR VEHICLES AND THE LIKE

[75] Inventor: Arnold A. Brevick, Hamilton, Ill.

[73] Assignee: Methode Electronics, Inc., Chicago, Ill.

[21] Appl. No.: 312,733

[22] Filed: Oct. 19, 1981

[51] Int. Cl.³ .............................................. H01H 9/00
[52] U.S. Cl. .............................. 200/61.54; 15/250.13; 200/11 G; 338/198
[58] Field of Search ...................... 200/61.54, 4, 11 D, 200/11 DA, 11 G, 11 K, 11 TW, 292, 153 M; 338/191, 200, 201, 198, 172, 179, 215; 15/250.15, 250.2, 250.17, 250.12; 318/444

[56] References Cited

U.S. PATENT DOCUMENTS

| 3,511,943 | 5/1970 | Kibler | 200/61.54 X |
| 3,794,784 | 2/1974 | Snider | 200/11 DA |
| 4,275,279 | 1/1981 | Wagatsuma et al. | 200/11 DA |
| 4,329,676 | 5/1982 | McDonald et al. | 338/198 |

Primary Examiner—A. T. Grimley
Assistant Examiner—Morris Ginsburg
Attorney, Agent, or Firm—Charles F. Pigott, Jr.

[57] ABSTRACT

An improved column mounted switch for vehicles and the like for controlling the windshield wipers and the windshield washer in an automobile or truck. One or more rotatable carriers are in electrical contact with a base member having electrical conductors. The rotatable carriers also have conductive member means which can enter into and pass out of electrically conductive relation with the electrical conductors to act as a switch having multiple functions. The carrier may comprise shaped portions of a conductive metal plate, with the shaped portions being embedded in an insulating plastic disc. Thus the shaped portions form a part of the smooth face of the disc which can smoothly rotate in contact with the electrical conductors of the base, while an added contact may be provided to the carrier by means of a conductive ring, as part of the conductive metal plate, exposed to the other side of the carrier for contact with other conductive member means. The design of this application permits the elimination of one carrier and cover, when compared with switches of the prior art having similar functions.

16 Claims, 10 Drawing Figures

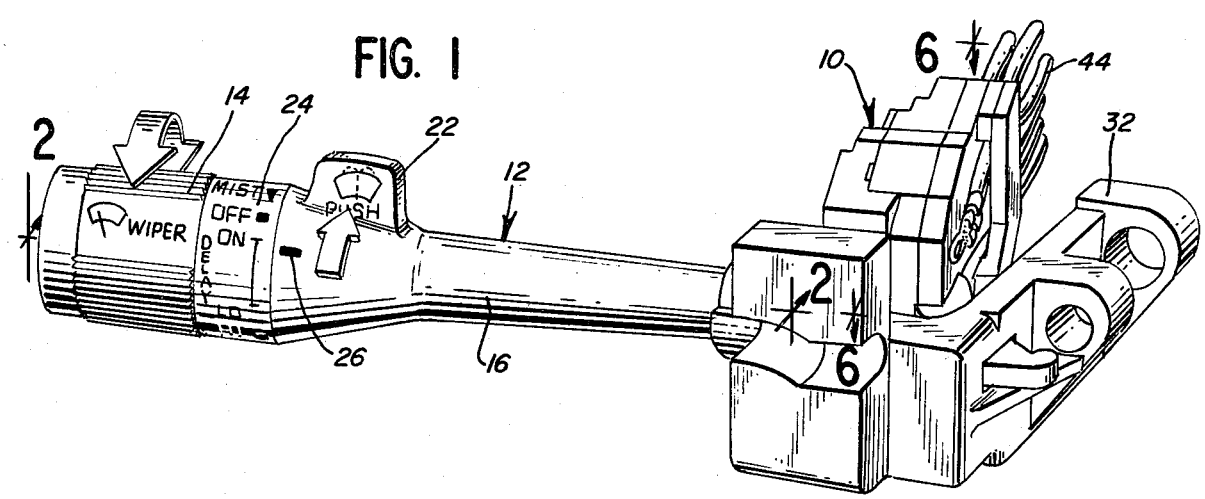
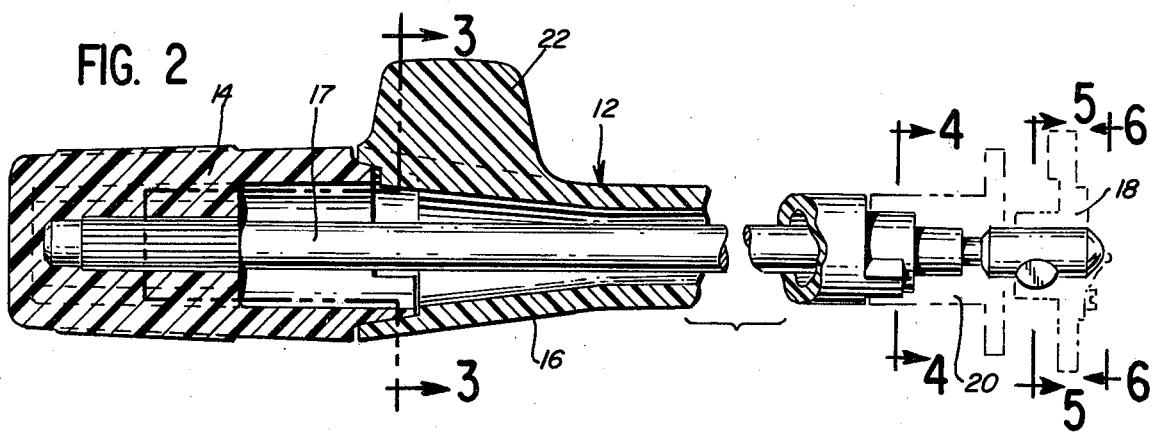
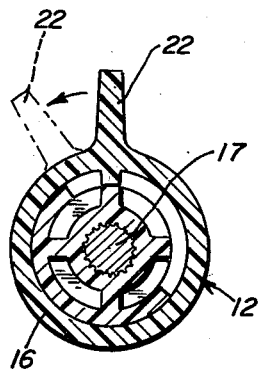
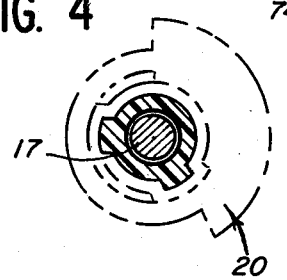
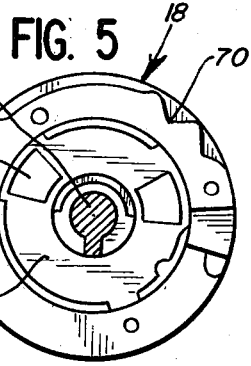
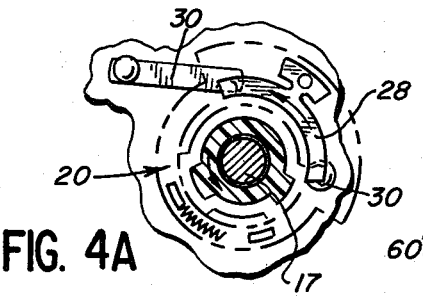
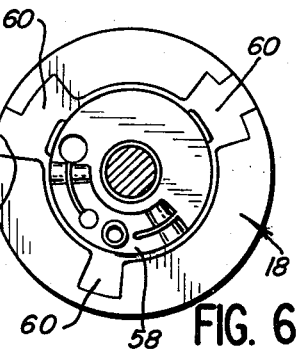

COLUMN MOUNTED SWITCH FOR VEHICLES AND THE LIKE

BACKGROUND OF THE INVENTION AND PRIOR ART

Switches are under development in the automotive industry for mounting on the steering column of a car or truck, for control of the windshield wipers and the windshield washers from a single control handle.

Typically, the control handle has a rotatable operating knob which can be turned between an off position, and several windshield wiper actuating positions including a low speed position, a high speed position, and an intermittent or delay position at which the windshield wiper operates intermittently but at a variable rate, depending upon the rotational position of the control knob. Also, the control knob can be turned to an operating position, from which position it is spring-biased back to off, so that the windshield wipers only operate when the control knob is positively held in that position.

In addition to this, the control handle may carry an outer sleeve which rotates around the control handle to actuate the windshield washer system. Thus, on the one control handle a large number of different functions are controlled by the same handle. It may also be desired for yet additional functions to be provided to the control handle.

Such a control handle, of course, requires a complex switch to make the necessary connections for accomplishing the functions called for by the various positions of the control handle.

In accordance with this invention, such a switch is improved in several ways. The particular design of this invention makes it possible to eliminate a rotatable carrier and a cover, compared with the corresponding switch of the prior art, without any loss in function. Specifically, means are provided for including a variable resistor circuit for the variable delay action of the windshield wiper, without the need for an extra rotatable carrier and cover.

Additionally, an improved type of rotatable carrier is provided, particularly useful for multiple function switching, in which three or more specific different switching positions can be provided by rotation of the carrier.

DESCRIPTION OF THE INVENTION

This invention relates to a switch mountable on the steering column of a vehicle for controlling windshield wipers, window washers, and the like, although it is also contemplated that the switch may be used in other operations as may be desired. The switch includes the following elements:

A base of nonconductive material is provided, having a plurality of electrical conductors in the base which may be connected to various motors, indicators, or the like. Multiple switching functions between the various conductors can be effected.

A rotatable main carrier is positioned against the electrical conductors of the base. The main carrier has first conductive member means that face and enter into current-conducting relation with the electrical conductors of the base in some rotating positions of the main carrier, but are out of such current-conducting relation in other rotating positions of the main carrier. The first conductive member means communicates through the main carrier with a conductive ring on the side of the main carrier opposed to the base so that electric current can flow through the carrier between the first conductive member means and the ring.

A base cover encloses the main carrier between the base cover and base, with the base cover carrying second conductive member means in contact with the conductive ring.

A rotatable wash carrier is positioned against the side of the base cover opposed to the main carrier, and electrical contact member means are positioned for contact with the second conductive member means in one rotating position and to be out of contact in another rotating position.

A wash cover then encloses the wash carrier between the wash cover and base cover, while an aperture extends through the switch from at least the wash cover to the main carrier, to receive a control handle adapted to rotate the main carrier and wash carrier. The control handle may be a main handle with an outer control sleeve. The outer control sleeve typically communicates at one end with the wash carrier, to independently rotate it for actuation of a windshield washing system, for example. The main portion of the control handle penetrates further into the switch, into rotating, connecting relation with the main carrier, so that the handle can rotate the main carrier through a plurality of various positions at which different switching functions are provided.

While specifically the switch of this invention is contemplated for use as a windshield wiper washer and control, it may also be used in entirely different fields and for entirely different functions, where multiple position switching is required from a single control.

The main carrier and base may cooperatively define a variable resistor system whereby the resistance through the system varies with the rotational position of the main carrier which, in turn, is governed by the handle, for providing a variable current flow path through the switch. For example, the variable resistor may include a resistive path defined in the base, while a conductive terminal may be carried by the main carrier and movable with the main carrier along the resistive path in contact therewith as the main carrier is rotated. This variable resistance circuit, for example, may be used with appropriate circuitry to provide intermittent windshield wiping, with the space of time separating each action of wiping being variable in a manner depending upon the specific amount of resistance provided at any given time by the variable resistor system.

Referring to an improved design of the main carrier in this invention, the first conductive members in the main carrier facing the base may comprise shaped peripheral portions of a conductive metal plate. The metal plate may be insert molded or otherwise inserted into a plastic disc, with the shaped portions forming a part of a smooth face of the disc, which can smoothly rotate in contact with the electrical conductors of the base, the plastic material of the disc forming the remaining part of the smooth face.

The same metal plate also may define the conductive ring described above, with the face of the disc opposed to the smooth face which faces the base including the conductive ring in exposed manner. The second conductive member means of the base cover may be positioned in sliding contact with the conductive ring. Accordingly, switching of current between the second conductive member means and any or all of the first conductive members can take place in a manner dependent upon the specific shape of the shaped portions of the conductive metal plate and the rotational position of the main carrier. The shaped portions of the first conductive members can be shaped to give complex switching characteristics to the switch between various of the first conductive members of the main carrier and the electrical conductors of the base.

For example, the electrical conductors of the base may have different radial spacing, relative to the disc which carries the first conductive member, the shaped portions of the first conductive members having different configurations at different radii. As the result of this, as the main carrier is rotated, the various electrical conductors of the base can encounter different patterns of the shaped portions of the conductive metal plate, which patterns may be predetermined to reflect the desired switching action between the electrical conductors of the base and the first conductive members.

Electrical contact is made when the shaped portions of the conductive metal plate are in contact with individual electrical conductors. The switch is off with respect to a given electrical conductor when it is not in contact with the first conductive member means.

Accordingly, a relatively simple carrier, with an insert molded conductive metal plate, surrounded with a disc or other suitable shape of nonconductive plastic with faces of the metal plate being exposed as described above, can be used for providing a complex switching function between numerous electrical conductors and other contacts. The electrical conductors of the base slide smoothly across the face of the main carrier as it is rotated, bringing conductive metal areas of the face and nonconductive plastic areas of the face into contact with each of the electrical conductors in a predetermined manner.

DESCRIPTION OF THE DRAWINGS

In the drawings,

FIG. 1 is a perspective view of the switch of this invention, adapted for mounting on the steering column of an automobile for control of the wiping and windshield washing functions of the vehicle.

FIG. 2 is a fragmentary longitudinal sectional view taken along line 2—2 of FIG. 1, of the switch and handle of FIG. 1, showing its connection with the various components of the switch.

FIG. 3 is a sectional view taken through line 3—3 of FIG. 2.

FIG. 4 is a sectional view taken through line 4—4 of FIG. 2.

FIG. 4a is a view similar to FIG. 4, showing how rotation of the structure shown can actuate a windshield washer circuit.

FIG. 5 is a sectional view taken along line 5—5 of FIG. 2.

FIG. 6 is a view taken along line 6—6 of FIG. 2.

Referring to FIGS. 1 and 2, the switch 10 of this invention is shown, having an attached rotatable control handle 12. Handle 12 carries an outer control handle 14 having a shaft 17 projecting into the switch 10. Also, handle 12 has an independently rotatable outer sleeve 16 which also projects into the switch for control of another portion of the switch. Handle 14 and shaft 17 connect with main carrier 18 to control its rotational position, while outer sleeve 16 connects with wash carrier 20 of switch 10 to control its rotational position in an independent manner.

Figure 7:
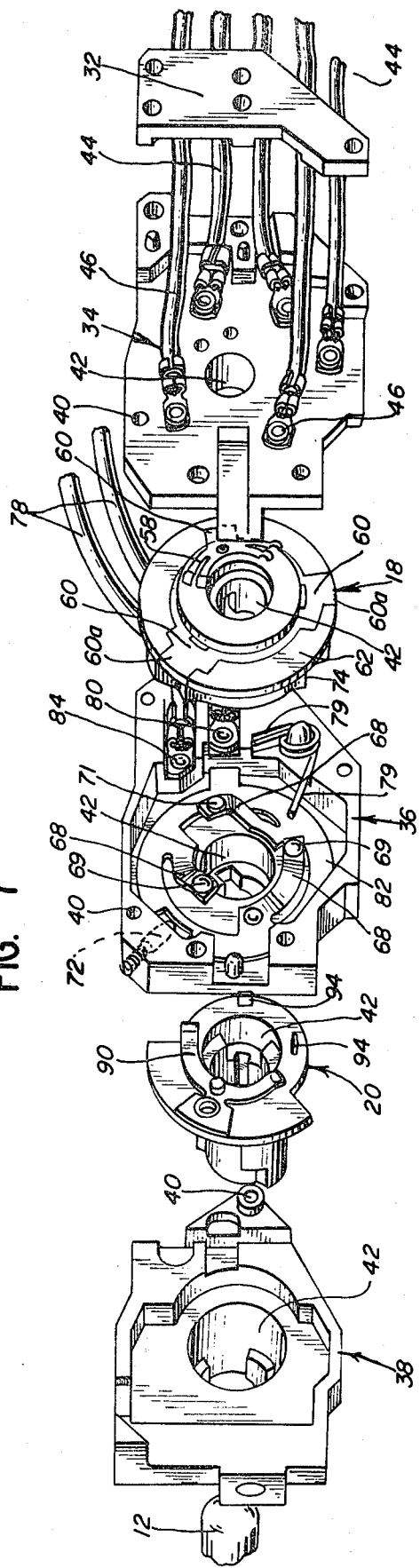
FIG. 7 is an exploded perspective view of the switch of this invention.

Thus, as indicated in FIG. 1 one may push the tab 22 of sleeve 16 to rotate wash carrier 20 to actuate the washing motor. Rotatable handle 14, on the other hand, has multiple rotational positions, with the various rotational positions being indicated as the various indicia 24 are brought into registry with marker 26, with carrier 18 being correspondingly rotatable into the position to provide the function indicated.

As specifically shown in FIG. 1, the handle 14 and carrier 18 are in a position to cause the windshield wiper to operate in an intermittent, delay action manner. Further rotation of handle 14 throughout the continuum of delay positions causes the period between actuations of the windshield wiper to vary. The indication "LO" provides continuous, low speed operation of the wipers when brought into registry with indicator 26, while the indication "HI" in similar circumstance provides high speed operation, with carrier 18 being appropriately rotated in each instance to provide the proper switching for such operation. The "OFF" position is provided as shown, while the mist position provides low speed operation of the windshield wiper only while held in that position because carrier 18 is spring-biased in that position to rotate back to the "OFF" position.

FIGS. 4 and 4a shown how wash carrier 20 can be rotated, with electrical contact member means 28 shown in FIG. 4a to be rotated into contact with the second conductive member means 30 of the previously described base cover.

Figure 8:
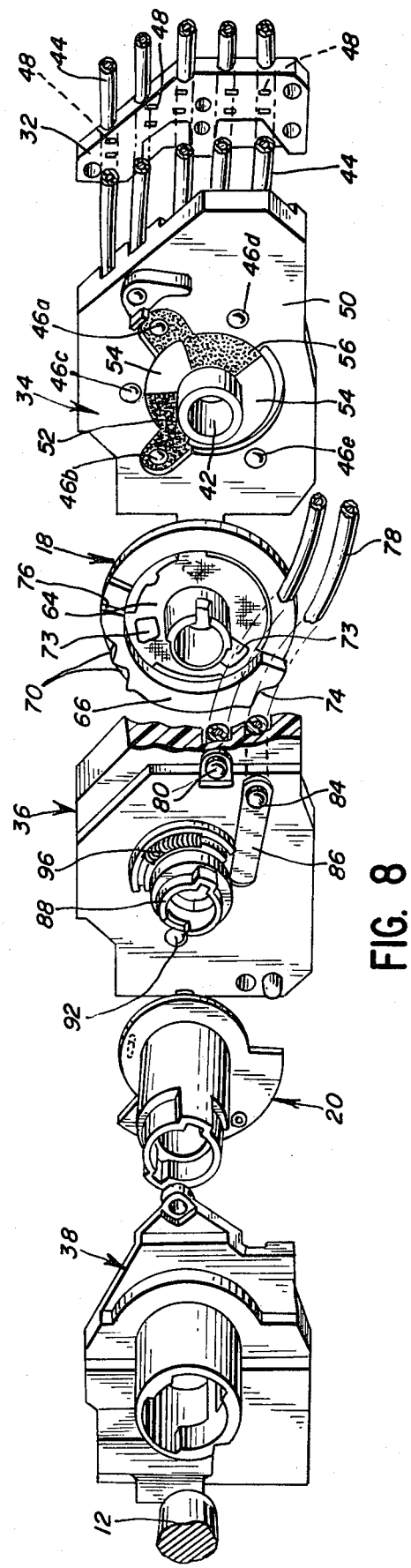
FIG. 8 is an exploded perspective view, taken from the other side of the switch of this invention showing the other faces of the various components.
Figure 9:
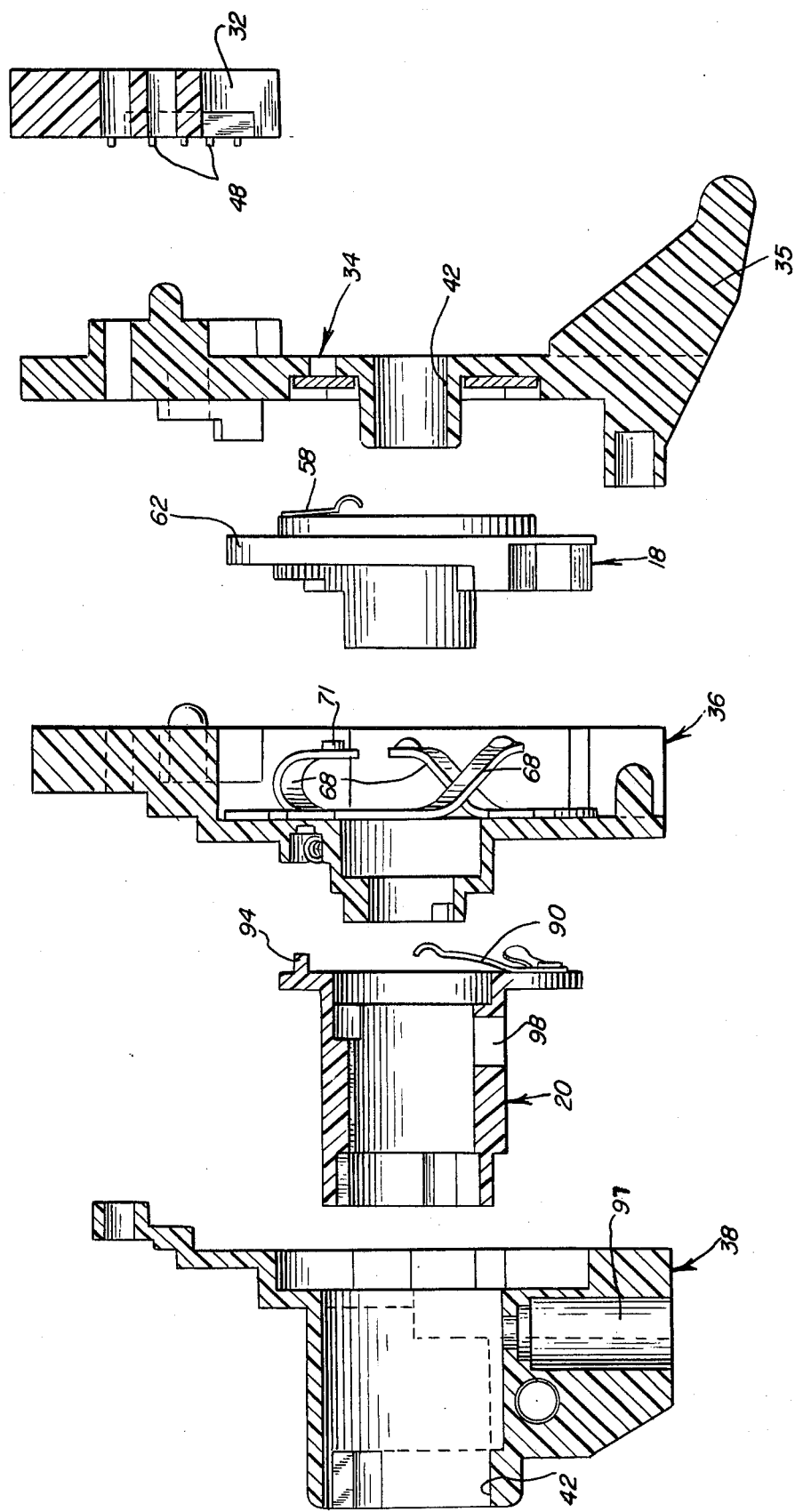
FIG. 9 is an exploded elevational view of the major components of the switch of this invention.

Referring also to FIGS. 5-9, details of construction of the switch of this invention are shown. As shown in FIGS. 7 and 8, the main components of the switch of this invention include a wire strain relief member 32 which is carried by base 34. Main carrier 18 is then positioned between base 34 and base cover 36. Wash carrier 20 is positioned between base cover 36 and wash cover 38. The structure may be bolted or riveted together through conventional bolt holes 40, and the control handle 12 can be seen ready to pass through the common aperture 42 of the various parts. Control handle 12 can taper as may be desired. The various members are basically made of nonconductive material, but carrying the various circuits and terminals as described.

Strain relief member 32 is adapted to protect the connections of wires 44 and the various electrical conductors 46a-e of base 34. Strain relief member 32 carries a plurality of transversely positioned projections 48 to press against wires 44 and hold them in firm retention.

Electrical conductors 46a-e pass through base 34 to serve as the electrical contact members on the inner surface 50 of base 34. Member 35 permits pivotal mounting of the switch in a holder of known construction.

Base 34 also defines on its inner surface a segment 52 of electrically resistive material defining an arc of a circle within the base. Other segments 54 of insulating material (typically the plastic of which base 34 is made) as an arc of the same circle are provided while a segment 56 of conductive material such as a silver coating is also provided. Two of the electrical conductors 46a and 46b, communicating with two of the wires 44, are positioned within this system.

Spring contact 58 of main carrier 18 is positioned at a radial distance to engage the circular arcs 52, 54 and 56. Accordingly, spring contact 58 may be moved to provide a variable resistance electrical contact with electrical conductor 46b, depending upon the rotational position of carrier 18 and the proximity of spring contact 58 to terminal 46b, causing the electric current to pass through a greater or a lesser distance of the resistive material 52 to provide a variable resistor. Spring contact 58 can also simultaneously provide electrical contact with terminal 46a through conductive layer 56.

Carrier 18 may be positioned so that the variable resistance function is operating when handle 14 is in any of the continuum of delay positions as shown in FIG. 1. In other positions, spring contact 58 does not provide electrical contact between electrical conductors 46a, 46b, and thus no current flows through those conductors. When current does flow through those conductors, it can be conveyed by the corresponding wires 44 to a conventional delay system for actuating the windshield wiper motor when a predetermined total amount of electrical current has passed through the variable resistance circuit, to provide the variably-timed, intermittent wiping effect.

The remaining electrical conductors 46c-e of base 34 are positioned for contact (in the proper rotational position) with first conductive members 60 of main carrier 18. First conductive members 60 may be peripheral, shaped portions as shown of a conductive metal plate, typically of copper or brass, but also any other conductive metal as may be desired such as nickel, silver, or aluminum, with the conductive metal plate being embedded in a plastic disc 62 having aperture 42. The surface of disc 62 as shown in FIG. 7 is preferably flush with the shaped portions 60 of the conductive metal plate.

On the other side of carrier 18, as shown in FIG. 8, a generally ring shaped conductor member 64 is shown, being typically an integral part of the same plate as shaped portions 60. Shaped portions 60 are generally peripheral projections extending out from the ring-shaped metal portion 64, which is recessed within a plastic rim 66 of main carrier 18. Spring arms 68, carried by the base cover constitute the second conductive member means for contact with conductive ring 64. Accordingly, as main carrier 18 is rotated by handle 14, first conductive members 60 enter into and out of contact with electrical conductors 46c-e in a manner dependent upon the rotational position of carrier 18 and the pattern of the shaped portions of member 60.

Electrical conductors 46d and e can be seen to be radially more distant from the center of aperture 42 than electrical conductor 46c. Similarly it can be seen that shaped portions 60 of the first conductor members have different configurations at different radii. For example the configuration of member 60 may be circumferentially larger at an inner portion and circumferentially narrower at an outer portion as at section 60a when compared with section 60. Accordingly, electrical conductors 46d and e, which may respectively relate to the low speed of windshield wiper operation and the mist operation, encounter a different pattern of the shaped portions (i.e., shaped portions 60a) than does the radially inward electrical connector 46c, which may relate to the high speed of windshield wiper operation.

On the other side of carrier 18, spring arms 68 are in substantially continuous contact with conductive ring 64, so that switching takes place between the various electrical conductors 46c-e and first conductive member 60 in a manner dependent upon the position of carrier 18, while spring arms 68 remain in substantially continuous contact.

It can be seen that the pattern of switching and the number of electrical conductors 46 which may participate can be very complicated if desired, depending upon the specific pattern of the shaped portions 60, which are in direct electrical communication with conductive ring 64.

Buttons 69 on arms 68 are typically punched extensions of the arms, with the exception of button 71, which may be a plastic insulating member. Conductive ring 64 may have open spaces 73 facing insulating material as shown in FIG. 8.

This combined structure makes it possible for the electric connection between conductive ring 64 and metal ring 82 to be broken in one rotational position of carrier 18, typically at the "OFF" position. In that position, buttons 69 are in contact with the apertures 73 of ring conductor 64 so that they are not in electrical contact with ring conductor 64. The spring arm 68 which carries plastic button 71 generally does not conduct electricity, but serves as a structural spring member to assist in pressing carrier 18 against electrical conductors 46c, d and e. Thus, in that one rotating position no electrical connection is made between the parts, but electrical contact is made in all other rotating positions.

Also as main carrier 18 rotates, the variable resistance system described above is operated in some carrier positions, and inactive in other carrier positions, by permitting or preventing the flow of electric current between spring contact 58 and electrical conductors 46a and 46b.

The remaining electrical conductors 46c, d and e typically connect with wires 44 which respectively actuate the high operation mode of the windshield wipers, the low operation mode, and the mist mode, which may be a recontact with the low operation mode but with a spring member forcing the handle back to the off position when released. Detents 70 as shown in FIG. 8 of main carrier 18 are adapted for interaction with spring mounted plunger 72 to rotationally position carrier 18 at the precisely desired rotational positions for either the low or high windshield wiper operation modes. Detent 74 in carrier 18 positions with plunger 72 in the "OFF" position for a snap-action of the rotatable knob 14.

Ledge 76 of carrier 18 rests against spring 79 of base cover 36 when the carrier 18 is in the rotational position to provide the mist mode. Thus carrier 18 in this position is biased back to the off position when the user releases handle 14.

Added lead wires 78 lead into base cover 36 and are secured there. One of the wires 78 connects to a terminal 80 which, in turn, communicates with the second conductive member means which is basically a ring of conductive metal 82 which carries the spring arms 68 previously described. This may be the source of electric current for operation of the switch. The other wire 78 communicates with another terminal 84 which communicates with a terminal strip 86 (FIG. 8). The wire 78 in contact with terminal 84 can communicate at its other end with the windshield wiper motor.

Wash carrier 20 fits on tubular projection 88 of base cover 36. Spring connector 90, carried on the bottom of wash carrier 20, is proportioned to provide simultaneous contact between strip 86, which communicates with terminal 84, and added connector 92 which communicates with metal ring 82, which is part of the second conductive member means. Accordingly, when wash carrier 20 is in the proper rotational position, a connection is made between the energized line 78 leading from the current source via terminal 80 through conductive ring 82, through terminal 92, along spring connector 90 to strip 86, and on to actuate the windshield washer, when wash carrier 20 is rotated to the proper position by tubular handle portion 16. Studs 94 of wash carrier 20 are positioned to bracket spring 96 so that carrier 20 is rotationally biased with spring connector 90 out of connection with strip 86, but manually movable into connection therewith by manipulation of tubular segment 16.

Wash cover 38 fits over wash carrier 20 to form one outer surface of the switch of this invention, with the structure being bolted or riveted together, or otherwise held together in any manner desired. Aperture 97 in wash cover 38 and slot 98 in wash carrier 20 permit a retention pin to hold shaft 17 of control handle 12 in position when switch 10 is installed.

During operation, spring arms 68 may be subject to an electrical potential provided by the wire 78 connected to terminal 80. As main carrier 18 is rotated by the manipulation of handle 14, the various shaped peripheral portions 60 of the conductive metal plate are also electrically energized through the contact of conductive ring 64 with spring arms 68. The various electrical conductors 46c, d and e of base 34, and their attached wires 44, are selectively energized as carrier 18 brings them into contact with portions 60.

Spring contact 58 on carrier 18 is also energized because it is in contact with metal ring 64. Accordingly, current can pass through contacts 46a and 46b, with variable resistance in the case of contact 46b for operation as previously described. Because of the particular use of the variable resistor as shown in this application, the need for an extra variable resistor carrier and another cover is eliminated. Accordingly, this simplified switch still can exhibit multiple switching functions while at the same time having simplified construction.

Other designs of switches utilizing different numbers of wires 44 and 78, different patterns of shaped portions 60 and the like may also be used.

The above has been offered for illustrative purposes only, and is not intended to limit the scope of the invention of this application, which is as defined in the claims below.

That which is claimed is:

1. A switch mountable on the steering column of a vehicle, which switch comprises:
   a base of nonconductive material having a plurality of electrical conductors in said base;
   a rotatable main carrier positioned against the electrical conductors of said base, said main carrier having first conductive member means that face and enter into electric current-conducting relation with the electrical conductors of said base in some rotating positions of the main carrier, but that are out of said current conducting relation in other rotating positions of the main carrier, said first conductive member means communicating through said main carrier with a conductive ring on the side of said main carrier opposed to said base;
   a base cover enclosing said main carrier between the base cover and base, said base cover carrying second conductive member means in contact with said conductive ring, said second conductive means being conductive through said base cover to a side of the base cover opposed to said main carrier;
   a rotatable wash carrier positioned against said side of the base cover opposed to the main carrier, and electrical contact member means positioned on said rotatable wash carrier for contact with the second conductive member means in one rotating position and to be out of said contact in another rotating position;
   a wash cover enclosing said wash carrier between the wash cover and base cover; and
   an aperture extending through the switch from at least the wash cover to the main carrier to receive a control handle adapted to rotate said main carrier and wash carrier;
   said main carrier and base having means cooperatively defining a variable resistor path whereby the resistance therethrough varies with the rotational position of the main carrier.

2. The switch of claim 1 in which said means for defining a variable resistor path includes a resistive path defined in the base communicating with an electrical conductor of the base, and a conductive terminal carried by the main carrier movable along said resistive path in contact therewith as the main carrier rotates.

3. The switch of claim 1 in which said first conductive member means facing said base comprise peripheral, shaped portions of a conductive metal plate, said shaped portions being embedded in an apertured insulating plastic disc, whereby said shaped portions form a part of a smooth face of said disc which can smoothly rotate in contact with the electrical conductors of the base.

4. The switch of claim 3 in which said electrical conductors have different radial spacing relative to said disc, said shaped portions having different configurations at different radii, for different patterns of contact between said shaped portions and said electrical conductors in different rotational positions of the main carrier.

5. The switch of claim 2 in which said conductive terminal defines a spring terminal, one end of which communicates with the resistive path and the other end of which communicates with a conductive coating which is in electrical contact with one of said electrical conductors of said base.

6. The switch of claim 1 in which said means for defining a variable resistor path includes a resistive path defined in the base communicating with one electrical conductor of the base, a conductive terminal carried by the main carrier movable along said resistive path in contact therewith as the main carrier rotates, said conductive terminal also simultaneously communicating with a conductive path on said base in communication with another electrical conductor of the base, said conductive terminal being capable of being rotated out of communication with both said resistive path and a conductive coating path.

7. The switch of claim 6 in which said first conductive member means facing said base comprise peripheral, shaped portions of conductive metal plate, said shaped portions being embedded in an apertured, insulating plastic disc, whereby said shaped portions form a part of a smooth face of said disc which can smoothly rotate in contact with the electrical conductors of the base.

8. The switch of claim 7 in which said electrical conductors have different radial spacing relative to said disc, said shaped portions having different configurations at different radii, for different patterns of contact between said shaped portions and electrical conductors in different rotational positions of the main carrier.

9. The switch of claim 8 in which said resistive path of the variable resistor path means defines an arc of a circle, whereby rotation of said main carrier moves the conductive terminal of the main carrier along said resistive path in a circular manner to provide variable resistance.

10. The switch of claim 9 in which said conductive path constitutes another arc of the same circle defined by the resistive path, the remainder of said circle being defined by insulating sections.

11. The switch of claim 1 which includes a strain relief member carried by said base to prevent damage to connectors between wires and said electrical conductors, said strain relief member carrying transversely positioned wire pinch members for retention of the wires in firm manner against said base.

12. The switch of claim 2 in which said resistive path defines a partial circle, whereby rotation of said main carrier moves the conductive terminal of the main carrier along said resistive path in a circular manner to provide variable resistance.

13. The switch of claim 1 in which snap-fit means are provided to urge said main carrier into one of a limited number of rotational positions.

14. The switch of claim 2 in which said conductive terminal is a spring which rests at one end of the resistive path and passes through the width of said main carrier into contact with said first conductive member means.

15. In a variable position switch, a base of nonconductive material having at least one first electrical conductor and a plurality of second electrical conductors in said base; a rotatable main carrier positioned against the electrical conductors in said base, said main carrier having first conductive members that face and enter into electric current-conducting relation with the second electrical conductors in said base in some rotating positions of the main carrier and that are out in said current conducting relation in other rotating positions of the main carrier, said first conductive members communicating through said main carrier with a conductive ring on a side of said main carrier opposed to said base, said first conductive members facing said base including shaped portions of a conductive metal plate, said metal plate being insert molded into a plastic disc with the shaped portions forming a part of a smooth face of said disc which can smoothly rotate in contact with the electrical conductors in the base, and plastic materials forming the remaining part of said smooth face, said metal plate also defining said conductive ring in conductive relationship to said metal plate, a face of said disc opposed to said smooth face carrying said conductive ring in exposed manner, said main carrier further having at least one electrical contact arranged to be in a variable resistive conductive relationship with said at least one first electrical conductor in other rotating positions of said main carrier, and conductive means on said base providing a variable resistive conductive path between said at least one first electrical conductor and said electrical contact.

16. The switch of claim 15 in which said second electrical conductors in the base have different radial spacing relative to said disc, said shaped portions having different configurations at different radii, for different patterns of contact between said shaped portions and electrical conductors in different rotational positions of the main carrier.

* * * * *